US011132660B2

(12) United States Patent
Sidhu et al.

(10) Patent No.: US 11,132,660 B2
(45) Date of Patent: Sep. 28, 2021

(54) SYSTEMS AND METHODS FOR DISTRIBUTED PEER TO PEER ANALYTICS

(71) Applicant: MASTERCARD INTERNATIONAL INCORPORATED, Purchase, NY (US)

(72) Inventors: Navjot S. Sidhu, Ardsley, NY (US); Vishal Anand, Mountain View, CA (US); Ryan Senci, Denver, CO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 309 days.

(21) Appl. No.: 15/839,263

(22) Filed: Dec. 12, 2017

(65) Prior Publication Data

US 2019/0180266 A1  Jun. 13, 2019

(51) Int. Cl.
| | |
|---|---|
| *G06Q 20/22* | (2012.01) |
| *G06Q 20/40* | (2012.01) |
| *H04L 29/08* | (2006.01) |
| *G06Q 20/20* | (2012.01) |
| *H04L 29/06* | (2006.01) |
| *G06Q 20/38* | (2012.01) |

(52) U.S. Cl.
CPC .......... *G06Q 20/223* (2013.01); *G06Q 20/20* (2013.01); *G06Q 20/401* (2013.01); *H04L 63/102* (2013.01); *H04L 63/123* (2013.01); *H04L 67/104* (2013.01); *G06Q 20/382* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,298,806 B1 | 3/2016 | Vessenes et al. | |
| 9,635,000 B1 | 4/2017 | Muftic | |
| 9,672,499 B2 | 6/2017 | Yang et al. | |
| 2013/0204886 A1* | 8/2013 | Faith | G06Q 30/06 707/756 |
| 2015/0379510 A1 | 12/2015 | Smith | |

(Continued)

FOREIGN PATENT DOCUMENTS

WO   2017136956 A1   8/2017

*Primary Examiner* — Jamie R Kucab
*Assistant Examiner* — Nicholas K Phan
(74) *Attorney, Agent, or Firm* — Armstrong Teasdale LLP

(57) ABSTRACT

A method of operating a distributed peer to peer analytics system of a permissioned distributed ledger is provided. The system includes a plurality of node computing devices in operable communication with each other over an electronic network. The method includes capturing, by a merchant computing device, sales data from a payment transaction, storing the captured sales data in a database of a first node, compiling within the first node the stored sales data into a transaction envelope, encrypting the transaction envelope with a private key of the first node, submitting, by the first node, the encrypted envelope to the permissioned distributed ledger, verifying, by a second node, the submitted encrypted envelope and adding the compiled sales data to a data block, committing, by the second node, the data block to the distributed ledger, and validating, by a consensus of the plurality of node computing devices, the committed data block.

20 Claims, 7 Drawing Sheets

(56) References Cited

U.S. PATENT DOCUMENTS

| | | |
|---|---|---|
| 2017/0046694 A1 | 2/2017 | Chow et al. |
| 2017/0075941 A1 | 3/2017 | Finlow-Bates |
| 2017/0236102 A1 | 8/2017 | Biton |
| 2017/0243222 A1 | 8/2017 | Balasubramanian |
| 2018/0019867 A1* | 1/2018 | Davis ............... H04L 9/0637 |
| 2018/0115413 A1* | 4/2018 | King ................. G06F 21/64 |
| 2019/0108542 A1* | 4/2019 | Durvasula .......... H04L 9/3297 |
| 2019/0155513 A1* | 5/2019 | Maeda ............... G06F 16/2255 |
| 2019/0228407 A1* | 7/2019 | Wu .................... G06Q 20/3823 |
| 2020/0076610 A1* | 3/2020 | Wang ................. H04L 9/0637 |
| 2020/0175600 A1* | 6/2020 | Mitch ............... G06K 19/07758 |

* cited by examiner

SYSTEMS AND METHODS FOR DISTRIBUTED PEER TO PEER ANALYTICS

BACKGROUND OF THE INVENTION

The present disclosure relates to data analytics ecosystems, and more particularly to a data analytics ecosystem including a decentralized peer to peer distributed ledger network.

Today's commerce systems are both physical, such as point of sale (POS) and back-end systems, and virtual, such as consumer-driven front-end systems or back-end cloud-based software. Conventional commercial entities that own data (e.g., a merchant, payment processing provider, supply chain management system, etc.), whether in whole or in part, perform data analytics in silos, that is, each entity is responsible for conducting its own analytics. This siloing process requires costly and complex technology investments, and often results in significant delay and further costs to share data with partnering entities, third-party analytics providers, or consumers who choose to share their personal data for gaining wider and deeper visibility into the end-to-end ecosystem. In many instances, data is amassed by the entity over lengthy periods, such as months or years, before submitted to analytics. The output of such analytics is therefore often untimely or obsolete by the time it is fully processed.

Accordingly, commercial ecosystem participants are typically unable to receive analytics output of data outside of the immediate control of the individual participant, and such participants are not able to easily and securely share their data or make their chosen data available where anonymized aggregates of the data can be used across the system to gain insights into the state of commerce as a whole. Conventional analytics systems must utilize time consuming and costly Extract, Transform, and Load (ETL) processes and data warehousing technologies to analyze and process their own data. Such conventional systems are costly and complex, and most small- to medium-sized business entities are unable to bear the set up and maintenance expenses of such business intelligence investments. For small business entities, such expenses typically outweigh the benefits achieved from the intelligence investment. Data is one of the most valuable assets owned by a business entity, but many businesses are not able to harness the value of this asset.

BRIEF DESCRIPTION OF THE DISCLOSURE

In an embodiment, a method of operating a distributed peer to peer analytics system of a permissioned distributed ledger is provided. The system includes a plurality of node computing devices in operable communication with each other over an electronic network. The method includes steps of capturing, by a merchant computing device, sales data from a payment transaction, storing the captured sales data in a database of a first node of the plurality of node computing devices, compiling, within the first node, the stored sales data into a transaction envelope, encrypting the transaction envelope with a private key of the first node, submitting, by the first node over the electronic network, the encrypted envelope to the permissioned distributed ledger, verifying, by a second node of the plurality of node computing devices, the submitted encrypted envelope and adding the compiled sales data to a data block, committing, by the second node, the data block to the distributed ledger, and validating, by a consensus of the plurality of node computing devices, the committed data block.

In an embodiment, a distributed analytics system for operating a distributed ledger for a peer to peer electronic network of participating nodes, includes at least one blockchain having at least one blockchain processor, a transactional node computing device configured to capture and compile transactional sales data into a transaction envelope, and broadcast the transaction envelope to the participating nodes, a collector node computing device configured to collect and validate the broadcast transaction envelope according to one or more business rules, and commit the transactional sales data to a data block, and an analytics node computing device configured to access the blockchain and query the blockchain to analyze the transactional sales data on the committed data block.

In an embodiment, a method of establishing an analytics candidate node on distributed peer to peer network is provided. The distributed peer to peer network utilizes a distributed ledger. The method includes steps of discovering, by the analytics candidate node, at least one available node on the network, advertising, by the analytics candidate node to the at least one available node, an availability of the candidate node to participate in the network, setting access permissions for the analytics candidate node based on permissions set by a data owner node computing device on the network, registering the analytics candidate node on the network according to the access permissions, publishing, by the registered analytics candidate node on a periodic basis, a status of the registered candidate node on the network, accessing, by the registered analytics candidate node, a data block of the distributed ledger containing transaction sales data entered on the distributed ledger by at least one peer node of the peer to peer network, and rendering a portion of the transactional data visible to the registered analytics candidate node according to the access permissions.

BRIEF DESCRIPTION OF THE DRAWINGS

FIG. 1 is a schematic diagram illustrating an example multi-party payment card processing system for enabling payment-by-card transactions.

FIG. 2 is a simplified block diagram of an example system used for participating in a peer to peer distributed ledger, in accordance with one embodiment of the present disclosure.

FIG. 3 illustrates an example configuration of a client system shown in FIG. 2, in accordance with an embodiment of the present disclosure.

FIG. 4 illustrates an example configuration of the server system shown in FIG. 2, in accordance with an embodiment of the present disclosure.

FIG. 5 is a simplified block diagram of an example distributed analytics system for a peer to peer network utilizing a distributed ledger, in accordance with one embodiment of the present disclosure.

FIG. 6 is a flow diagram illustrating an exemplary process for publishing merchant sales data to a distributed ledger, in accordance with one embodiment of the present disclosure.

FIG. 7 is a flow diagram illustrating an exemplary process for configuring and adding nodes to the distributed analytics system shown in FIG. 5, in accordance with one embodiment of the present disclosure.

Figure 1:
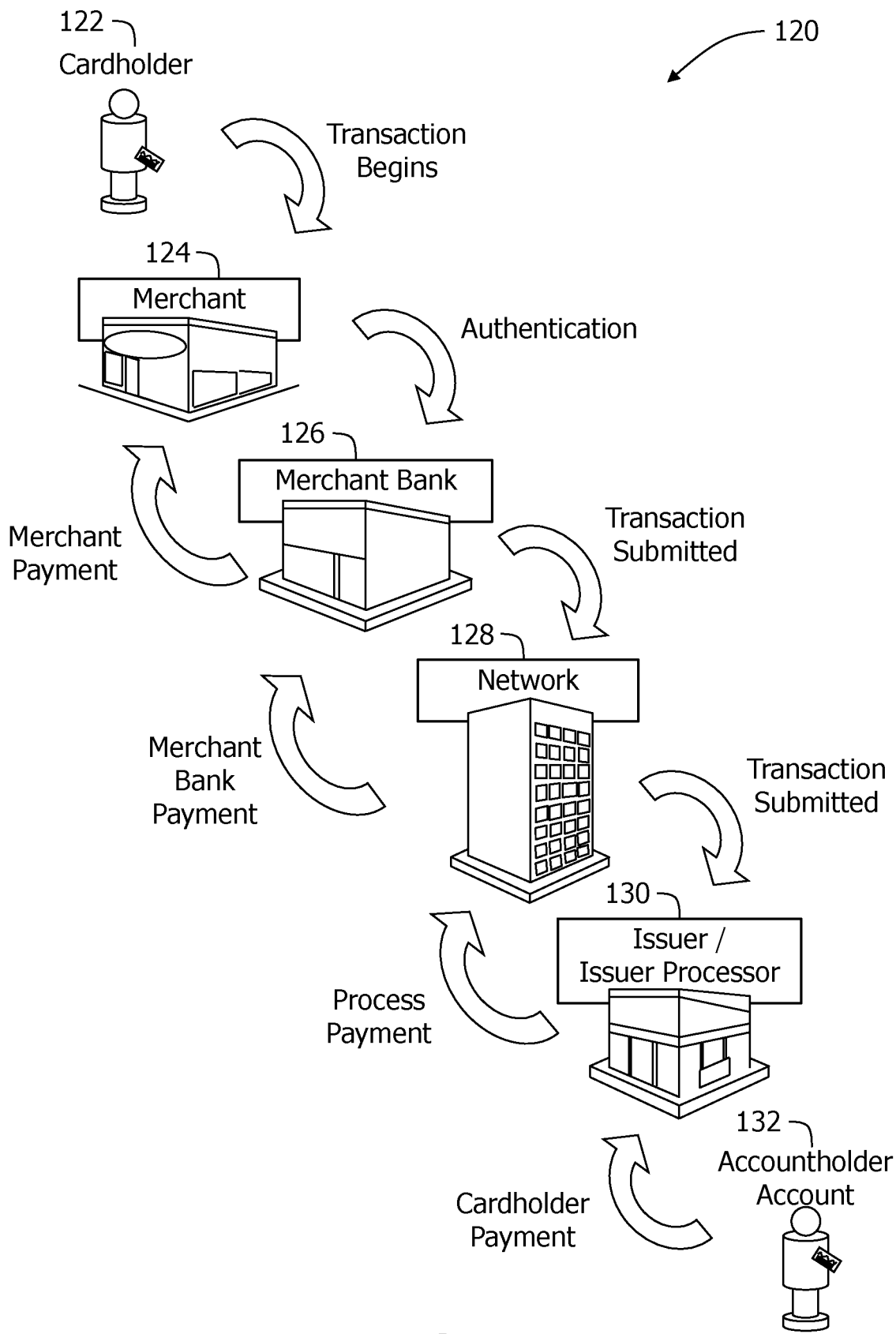
FIGS. 1-7 show example embodiments of the systems and methods described herein.

The following detailed description and exemplary embodiments are intended for illustration purposes only and are, therefore, not intended to limit the scope of the disclosure.

DETAILED DESCRIPTION OF THE DISCLOSURE

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to example embodiments, namely, methods and systems utilizing peer to peer distributed ledgers to verifiably submit analytic data to a decentralized network in real time. Systems and methods according to the disclosure herein thus provide significantly more speed and accuracy into the data gathering process of analytics for participants that desire analysis of particular data sets, but may not themselves perform such complex data analysis.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, a "processor" may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term processor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, a computer program is provided, and the program is embodied on a computer readable medium. In an exemplary embodiment, the program is executed on a single computer system, without requiring a connection to a sever computer. In at least one embodiment, the program is run in a Windows® environment (Windows is a registered trademark of Microsoft Corporation, Redmond, Wash.). In another embodiment, the program is run on a mainframe environment and a UNIX® server environment (UNIX is a registered trademark of X/Open Company Limited located in Reading, Berkshire, United Kingdom). In these examples, the program is flexible and designed to run in various different environments without compromising any major functionality. In some embodiments, a system includes multiple components distributed among a plurality of computing devices. One or more components may be in the form of computer-executable instructions embodied in a computer-readable medium. The systems, processes, and programs are not limited to the specific embodiments described herein. In some embodiments, system or process components can be practiced independently and separately from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, wearables, smartphones, personal digital assistants (PDAs), key fobs, and/or any other computing devices capable of storing and providing account data. Each type of transaction card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "payment network" refers to a system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, crypto-currency (e.g., Bitcoin) etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

As used herein, the term "distributed ledger" refers to a public ledger of all transactions performed between parties having access to the distributed ledger. The distributed ledger may be blockchain-based, or a similar system that creates a decentralized immutable ledger of cryptographically added blocks to append to existing transactions. Within this disclosure, "distributed ledger" and "blockchain" may be used interchangeably, but a person of ordinary skill in the art will understand that the distributed ledger embodiments described herein are not limited solely to conventional blockchain technologies.

Where the distributed ledger utilizes blockchain technology specifically, transaction information is encapsulated in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained. One or more computing devices may be included in a peer to peer network that utilizes the distributed ledger, and which may be configured to process and record transactions as separate blocks in a chain. In some instances, the chain may represent a ledger of transactions in chronological order, or may be presented in another organized structure that may be suitable for use by the peer to peer network. The peer to peer network may be a public network, or a trusted private network.

As used herein, the term "node" refers to a computing device having a processor and memory for interacting with the peer to peer network. The computing device acting as a node is capable of: connecting to and communicating with the network; downloading information from the network such as a blockchain; storing the downloaded information (e.g., blockchain); listening for transactions on the network; validating transactions; passing valid transactions to the network; listening for individual blocks; validating individual blocks; passing valid blocks to the network; creating blocks; and "mining" blocks in the chain.

The peer to peer network described herein is part of an ecosystem that includes consumers, merchants, analytics/advisory service providers, point-of-sale (POS) application or POS device manufacturers, and/or financial institutions, as well as other interested entities that may subscribe to analytics/advisory services. Ecosystem participants typically desire privacy, and thus, in most embodiments, all data shared across the network is considered to be anonymized, pseudo-anonymous, aggregated, and/or otherwise masked to meet participant requirements, and also to conform with all local, state, national, and international privacy/data usage laws relevant to the network.

As used herein, the term "consumer" refers to a cardholder of the payment network. In the embodiments described herein, each payment card utilized with the payment network is treated as a separate identity, and card-level data is not shared with the peer to peer network. In some embodiments, financial institution identifying information may be shared across the network.

As used herein, the term "merchant" refers to an identifier of a legal business entity, as well as a location of the legal entity, where applicable. In some embodiments, a one-to-one mapping may be had between the location and the entity itself, whereas in other embodiments, a location (e.g., a geocoded address) may not be available.

As used herein, the term "analytics provider" refers to a network participant capable of processing and analyzing data distributed across the network. In some embodiments, an identifier of the analytics provider will include legal entity information.

As used herein, the term "financial institution" refers to a network participant capable of processing and analyzing financial transaction information for transactions blocks submitted to the network. In some embodiments, the financial Institution is assigned a Globally Unique Identifier (GUID) based on its particular legal entity information.

In some embodiments, other network participants, such as a subscriber to the outcomes of the analytics, may be simply application program interface (API) users within the network, and each assigned API keys to access one or more levels of the network.

In an exemplary embodiment, a peer to peer analytics network publishes real-time merchant sales data to participating nodes/computing devices having permission to access a distributed ledger. In some embodiments, a POS terminal of a merchant captures SKU-level (cart) data and publishes the captured cart data to a network where authorization and validation peers store the data in a shared ledger entry, which is then propagated to other nodes within the network by a consensus mechanism. Such ledger entries may be at the national, regional, or individual merchant/store level. In at least one embodiment, a plurality of nodes within the network represent computing devices merchant entities, and each such participating entity will have stored within their respective databases product SKUs and/or quantities of products sold for particular transactions. In some instances, ledger entries by merchants will be visible only to that particular merchant, and/or by trusted third parties (partner merchants, analytics providers, financial institutions, etc.) granted access permission from the particular merchant. In the exemplary embodiment, merchants have the ability to grant or revoke access to their ledgers.

In exemplary operation, a distributed analytics system includes the peer to peer analytics network, and stores the cart data of individual transactions. In some embodiments, the cart data of the transaction includes the identity of one or both parties to the transaction as a hashed identifier, which may be signed by the key of one or both participants. In one example, SHA-256 hashing is utilized, which may additionally include Elliptic Curve Digital Signature Algorithm (ECDSA), where appropriate. In the exemplary embodiment, the distributed analytics system is configured to securely store assigned GUIDS and Key relationships in the back-end.

Due to the secure nature of an immutable, distributed ledger, fraud is not a particular concern in the collection and validation of the published sales data. Accordingly, in the examples described herein, it is considered generally adequate for a participating node to accept the transaction data based on the signature. Nevertheless, in an exemplary embodiment, an additional validation step is performed to avoid committing to the distributed ledger redundant ledger entries (e.g., from different nodes receiving the propagated sales data). Redundant entries may be reduced or eliminated by a node processor computing the hash of each transaction envelope submitted to the distributed ledger, and then rejecting transaction envelopes that have a matching hash within a last commit window (e.g., 5 minutes). Such rejected transaction envelopes may be placed in a separate block during each commit window.

In the exemplary embodiment, the distributed analytics system manages access and permissions to the network according to the role and/or level of participation of the individual participant. Such permission management advantageously enables the network to allow for selected multi-tenancy, development, administration, and audit of the network. In most implementations, and in accordance with all relevant governing privacy and data usage laws, the SKU-level data propagated to the network is anonymized and/or masked. In exemplary operation of the distributed analytics system, some participant (i.e., nodes) roles may be defined as follows.

A "Data Owner" is the owner of the data, and may typically be a merchant or a consumer/cardholder. In the exemplary embodiment, a "Data Administrator," or "DataAdmin," role is assigned to specific participating merchants and consumers, for allowing access to only transactions for that particular merchant/consumer. The DataAdmin functions for development and administration of the network, and has access to anonymized data for processing purposes. Use of public and private keys enables enforcement of the DataAdmin role by rendering certain data/transaction envelopes accessible only for the specific keys provided with the envelope or access request. In some embodiments, the Data Owner defines the specific levels of data access and relevant semantics. In the exemplary embodiment, the DataAdmin does not correlate anonymized data to the Data Owner.

An "Analytics Processor" may function as the development role for running analytics on the distributed analytics system. In an exemplary embodiment, the Analytics Processor has access to only anonymized data that particular entities have chosen to share their data with the Analytics Processor. The system is configured to internally track access rights for each Analytics Processor and include controls to revoke access of any participant at any time. Due to the nature of a distributed ledger or blockchain being a shared data-layer, the system should not need to have an Analytics Processor retroactively purge historic data at any site. An "Analytics User" refers to any consumers of anonymized insights from the Analytics Processor, or from direct participation in the peer to peer network (with granted access/permissions). In some embodiments, the anonymized insights may be a subset data that is available to participating Data Owners.

In the exemplary embodiment, the distributed analytics system utilizes a network model of leverage sharding, which is a type of data partitioning that separates large data sets into smaller, faster, more easily managed portions called data shards. In addition to the roles of participating entities/nodes described above, the peer to peer network of the distributed analytics system defines roles for two particular types of nodes within the network: (1) a Collector and Committer Node, which functions to collect transaction data when propagated, validate the collected data according to specified business rules, and commit the validated data to a block that is broadcast to other registered peer nodes for validation (e.g., by consensus), after which the block is added to the blockchain; and (2) an Analytics Node, which is a participating node that has permission-based access to the distributed ledger to query information. In the exemplary embodiment, a plurality of participating nodes in the network can function as either type of node.

In further operation of the distributed analytics system, new nodes may be added to the network on a trust-based discovery system, which may include, for example, use of certificates and signature tokens. In an example embodiment, when a new candidate node is added to the network, the candidate node will have an address of a primary node for the geographic zone configured in an address book associated with the particular entity. The primary node may then validate the credentials of the candidate node, determine whether the candidate node may join the network, and assign a role to the candidate node defining the level of participation thereof in the network. Once a candidate node is granted such access and joins the network, candidate node may receive the addresses of other peer nodes within the same geo zone.

In at least one embodiment, storage of transaction data (SKU-level) is limited to the particular geo zone of the particular node. For example, a node with the geo zone located in China may be restricted from receiving and/or storing data related to transactions in the United States. In some embodiments, limited access may be granted to an Analytics Processor node to render at least a portion of the anonymized data visible thereto. In this example, the Analytics Processor node, to retrieve data from outside of its particular geo zone, may contact a main, or strongest, node registered on the network to obtain relevant permissions.

In some embodiments, the distributed analytics system utilizes network protocols and network specific messages. Such network messages may be more specific for public networks, and in some instances, more generic for participants in private network, and particularly where the private network participants are assigned different roles. A blockchain on a public network, for example, is generally secured by hashing power and is mutable by a majority of the hash rate, but may be vulnerable to threats from a large entity controlling a significant portion of the validated transactions. In contrast, a blockchain on a private network is secured by the distributed consensus model and is mutable by a majority of validating nodes, but may be vulnerable to a threat of validator collusion. The exemplary embodiments described herein mitigate the vulnerability of private networks by the administration and management of network protocols and granted access/permissions to participating entities. Some exemplary network messages include, without limitation, Discovery, Registration, De-registration, Heartbeat, GetBlock, And Application Messages.

Discovery messages may include a set of messages that allows a participating node to dynamically discover other nodes with which it can communicate on the network. The responses to Discovery messages may include information for routing or sending messages to available peers in the network or target nodes as applicable. In an example embodiment, Discovery messages are implemented at node startup, or when failures in communication are encountered.

Registration messages are utilized to advertise the availability of a node to other nodes in the network. In an example embodiment, Registration messages include the identity of the advertising node, as well as any credentials that it has been issued to enable participation in the network. In some embodiments, a Registration message may also be utilized to authenticate the advertising/registering node. De-registration messages are utilized similarly, but for the opposite reason.

Heartbeat messages are used to periodically publish the status of a node to the network. For example, the lack of a heartbeat for a number of consecutive intervals, that is, no Heartbeat messages received over time, may result in the uncommunicative node being de-registered from the network due to unknown state. In normal operation, individual nodes experience straightforward shutdown and startup processes, and thus leverage their corresponding Registration and De-registration messages explicitly. Where nodes do not explicitly transmit a De-registration message, for example, the Heartbeat message (or lack of reception thereof) may be utilized to de-register a node due to the "unknown" state of the node under potential failure scenarios, including network segmentation.

GetBlock messages may use as input an explicit block ID, and as a default behavior where and explicit block ID is not provided, may instead return the last validated block.

Application Messages may include, without limitation: (i) SendTxn; (ii) Publish Block, which propagates the last validated block for all interested network nodes to consume; (iii) Validate Block, which provides a block ID to determine the data-integrity of a block represented by the block ID; and (iv) Get Chain.

At least one technical problem with known systems is that, in view of the volume of data processed and the diversity of preferences or rules that may be applied, it can be difficult, time-consuming, and/or resource-intensive to gather and process data for analysis. The embodiments described herein address at least these technical problems. By processing the data in the manner described in this disclosure, some embodiments improve user experience, user efficiency, and/or user interaction performance by utilizing peer to peer distributed ledgers that verifiably submit analytic data to a decentralized network in real time. Additionally or alternatively, some embodiments potentially reduce a quantity of requests to provide data. In this manner, the embodiments described herein may facilitate achieving a balance between convenience to the user and securing the data. Additionally, some embodiments may reduce processor load by reducing an amount of data to be analyzed or processed or by processing it in a distributed manner, reduce network bandwidth usage and/or improve communication between systems by reducing an amount of data to be transmitted, improve processor security and/or data transmission security by utilizing peer to peer distributed ledgers that verifiably submit analytic data to a decentralized network in real time, and/or reduce error rate by automating the analysis and processing of data. In some embodiments, the subject matter described herein may facilitate increasing processor speed and/or improving operating system resource allocation.

FIG. 1 is a schematic diagram illustrating an example multi-party transaction card processing system 120 for enabling payment-by-card transactions between merchants 124, card issuers 130, and cardholders 122. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads account information of cardholder 122 from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether account 132 of cardholder 122 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of account 132 of cardholder 122 is decreased. Normally, a charge for a payment card transaction is not posted immediately to cardholder's 122 account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant bank 126, issuer bank 130, and an account merchant 124 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
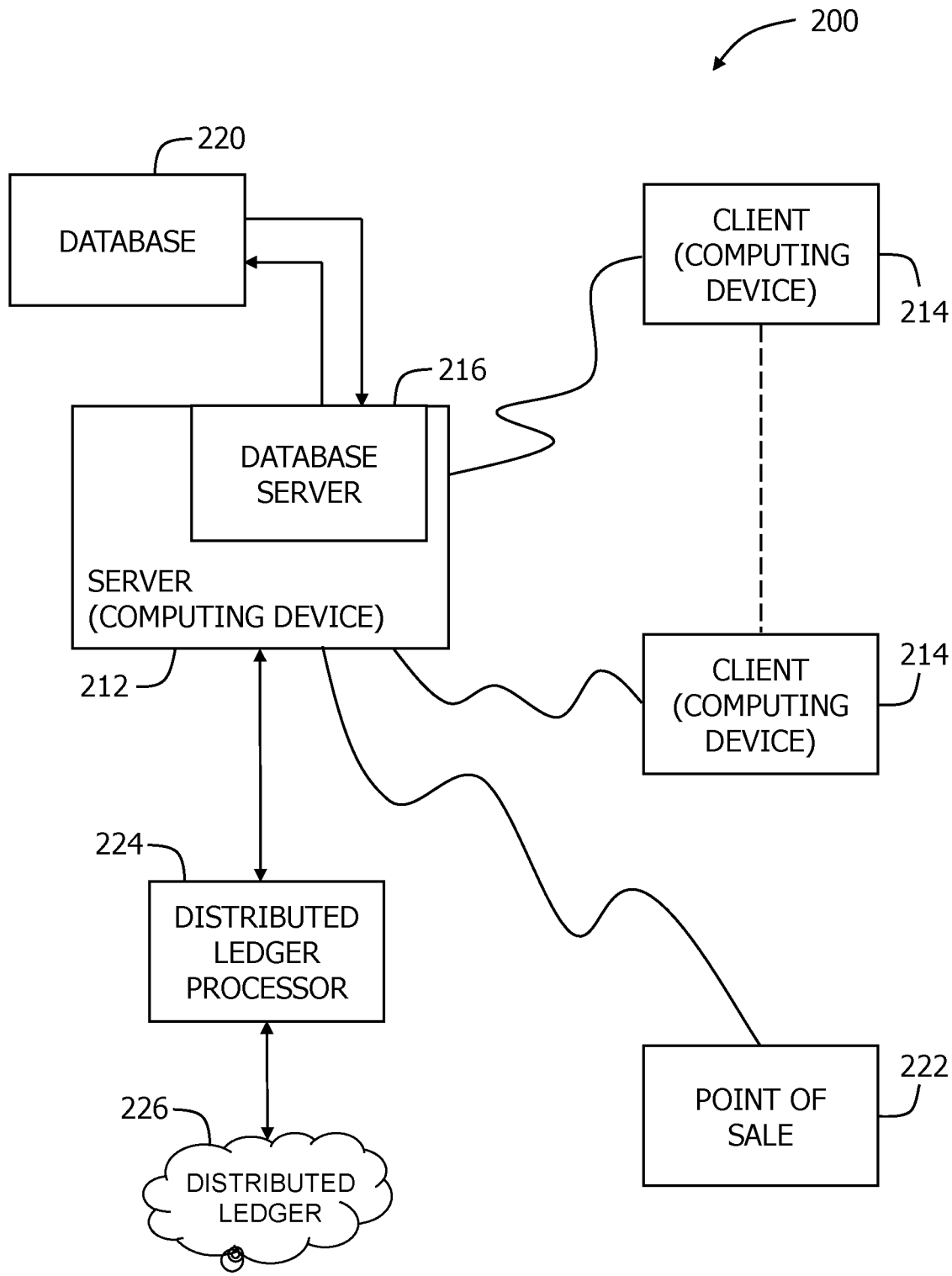

FIG. 2 is a simplified block diagram of an example system 200 used for participating in a peer to peer distributed ledger, in accordance with one embodiment of the present disclosure. System 200 may be implemented in the performance of payment-by-card transactions received as part of processing cardholder transactions. In an exemplary embodiment, system 200 is a payment processing system that is configured to communicate with and share information to a distributed ledger.

In the exemplary embodiment, system 200 includes a server system 212 and client systems 214. In some embodiments, client systems 214 include computers configured to implement a web browser or a software application, which enables client systems 214 to access server system 212 using the Internet. Client systems 214 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 214 include any device capable of accessing the Internet including, but not limited to, a desktop computer, a laptop computer, a personal digital assistant (PDA), a cellular phone, a smartphone, a tablet, a phablet, or other web-based connectable equipment.

In an embodiment, server system 212 includes a database server 216 that is communicatively coupled to a database 220 for storing data. In an exemplary embodiment, database 220 stores transaction information from a plurality of cardholders and paths based on the individual transactions. According to the exemplary embodiment, database 220 is disposed remotely from server system 212. In other embodiments, database 220 is decentralized, or may a portion of server system 212. In the exemplary embodiment, a user (not shown) is able to access database 220 through client systems 214 by logging onto server system 212.

System 200 further includes one or more POS systems 222 that are communicatively coupled with the server system 212. POS systems 222 may be, for example, merchants 124 as shown in FIG. 1, and are communicatively coupled with server system 212 through payment network 120. POS 222 may include, without limitation, machines that accept card swipes, online payment portals, or stored payment card numbers for recurring transactions.

In an exemplary embodiment, server system 212 is associated with a financial transaction interchange network, such as network 128 shown in FIG. 1, and is also referred to as an interchange computer system. In some embodiments, server system 212 is used for processing transaction data and analyzing for fraudulent transactions. In one embodiment, at least one of client systems 214 includes a computer system associated with an issuer of a transaction payment card. Accordingly, server system 212 and client systems 214 may be utilized to process transaction data relating to purchases a cardholder makes utilizing a transaction card processed by the interchange network and issued by the associated issuer. In the exemplary embodiment, at least one client system 214 may be associated with a user or a cardholder seeking to register, access information, or process a transaction with at least one of the interchange network, the issuer, or the merchant. In addition, client systems 214 or POS systems 222 may include individual POS devices (not shown) associated with a merchant and used for processing payment transactions. In an alternative embodiment, at least one client system 214 is utilized for investigating potential breaches.

In the exemplary embodiment, includes a distributed ledger processor 224 communicatively coupled with server system 212. Distributed ledger processor 224 can access server system 212 to store and access data and to communicate with the client systems 214 through server system 212. In some embodiments, distributed ledger processor 224 may be associated with, or is part of the payment system operating as its own node, or in communication with the payment network 120, shown in FIG. 1. In other embodiments, distributed ledger processor 224 is a separate node and is in electronic communication with the payment network 120. In some embodiments, distributed ledger processor 224 may be associated with, or be part of merchant bank 126, interchange network 128, and issuer bank 130, all shown in FIG. 1. Alternatively, each of these entities may themselves operate as separate respective nodes (see FIG. 5, below), and each have its own distributed ledger processor.

In operation, when a ledger transaction is initiated with server system 212, server system 212 compiles a body of information from database server 216 or database 220 into an envelope and encrypts the compiled envelope. Server system 212 then submits the encrypted envelope to distributed ledger processor 224 for distribution to distributed ledger 226. In some embodiments, system 212 encrypts the envelope with a private key of server system 212. Server system 212 may submit the encrypted envelope to distributed ledger 226 or the Internet, a private network, or through one or more of the other electronic communication systems described above.

Figure 3:
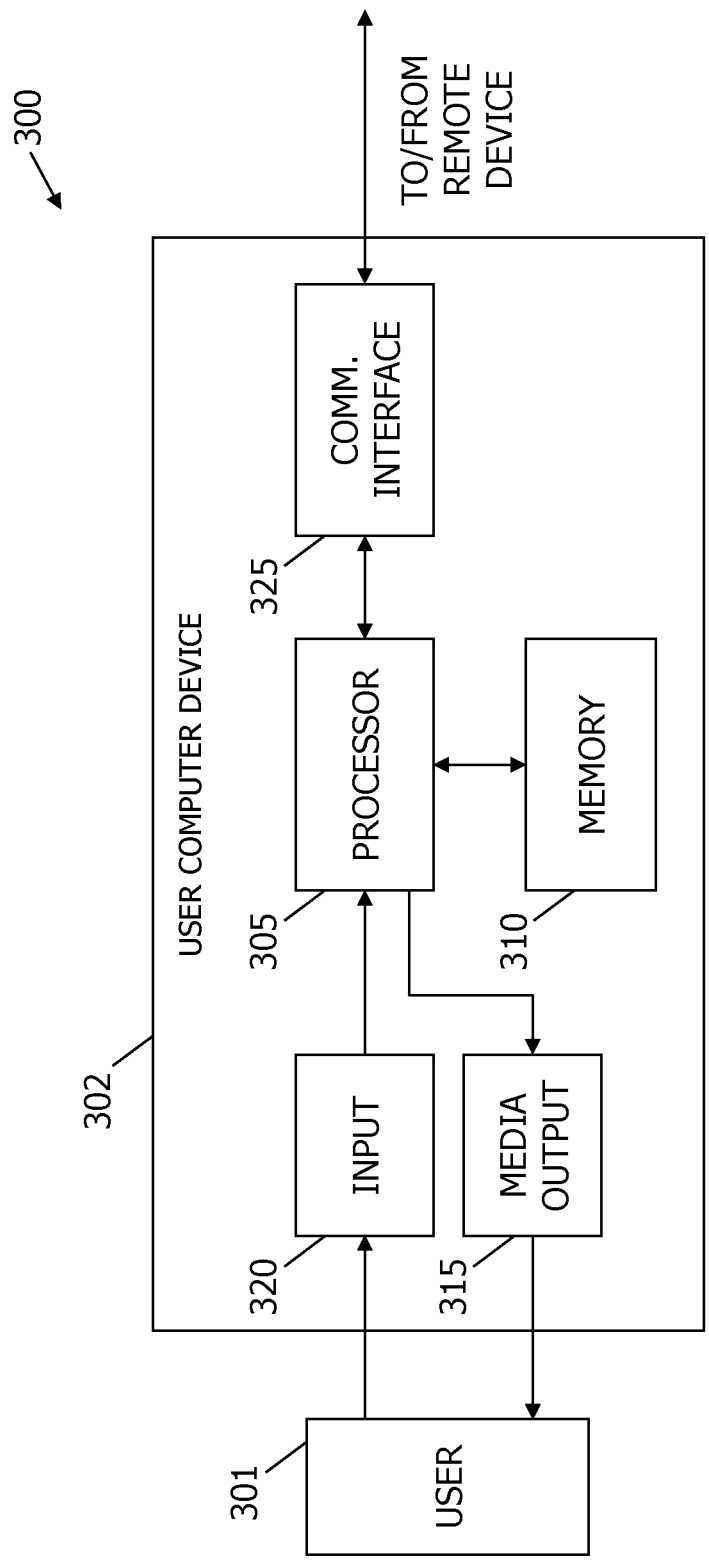

FIG. 3 illustrates an exemplary configuration of a client system 300 in accordance with an embodiment of the present disclosure. In the exemplary embodiment, client system 300 includes at least one user computer device 302, operated by a user 301. User computer device 302 may include, but is not limited to, one or more of client systems 214 and distributed ledger processor 224 (both shown in FIG. 2). User computer device 302 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, the any device allowing information such as executable instructions and/or transaction data to be stored and retrieved. Memory area 310 may further include one or more computer readable media.

In an exemplary embodiment, user computer device 302 further includes at least one media output component 315 for presenting information to user 301. Media output component 315 may, for example, be any component capable of converting and conveying electronic information to user 301. In some embodiments, media output component 315 includes an output adapter (not shown), such as a video adapter and/or an audio adapter, which is operatively coupled to processor 305 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser and/or a client application, to user 301. The graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

In an embodiment, user computer device 302 further includes a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

In an exemplary embodiment, memory area 310 stores computer readable instructions for providing a user interface to user 301 through media output component 315 and, optionally, for receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 5:
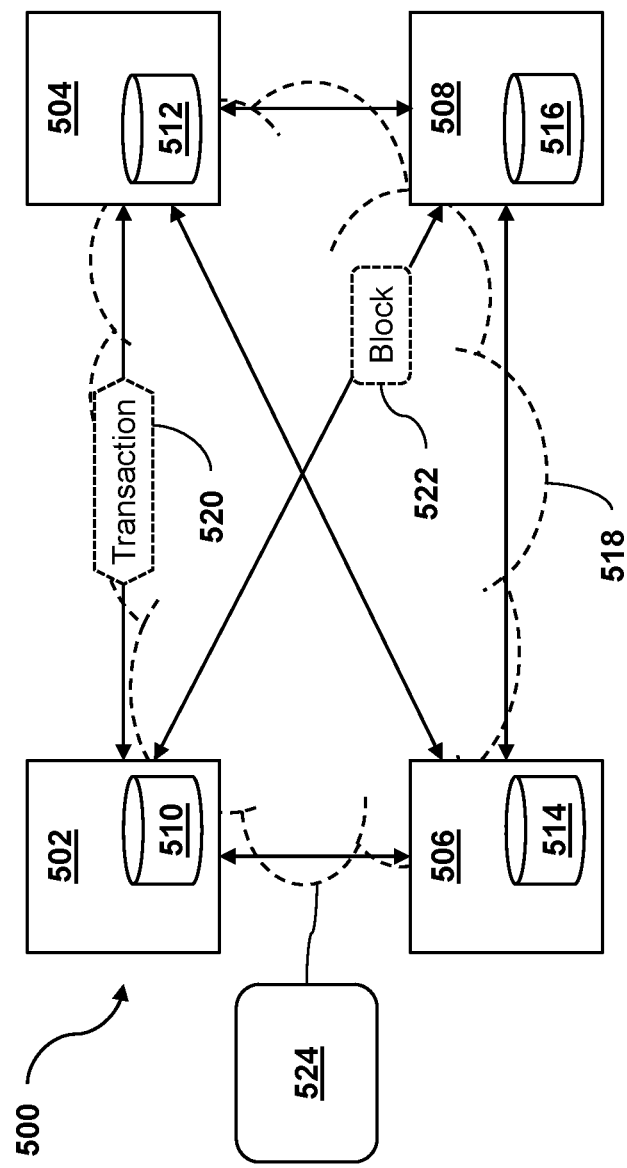
Figure 6:
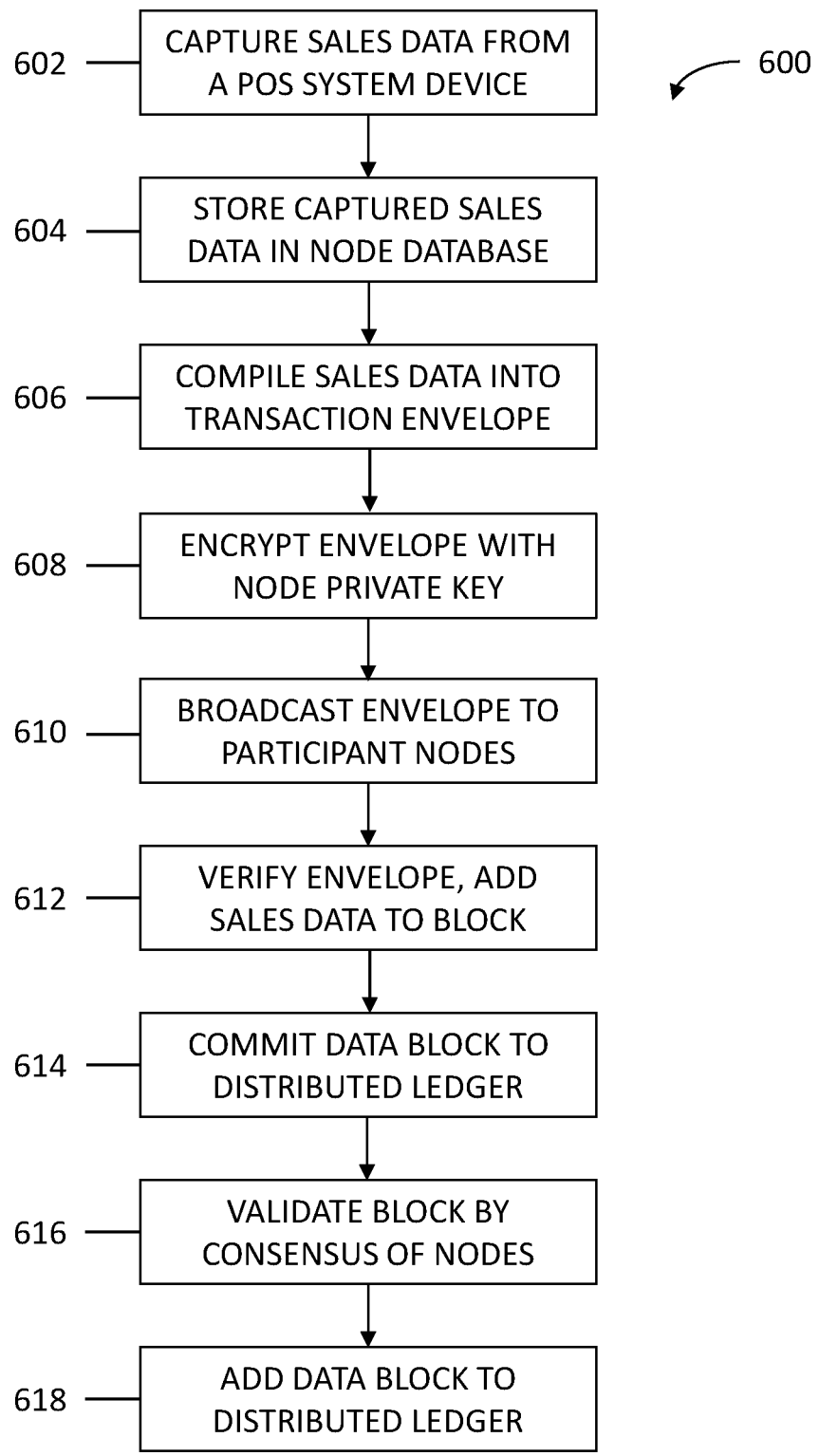

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 may be programmed with instructions such that it may execute the processes as illustrated in FIGS. 5 and 6, below.

Figure 4:
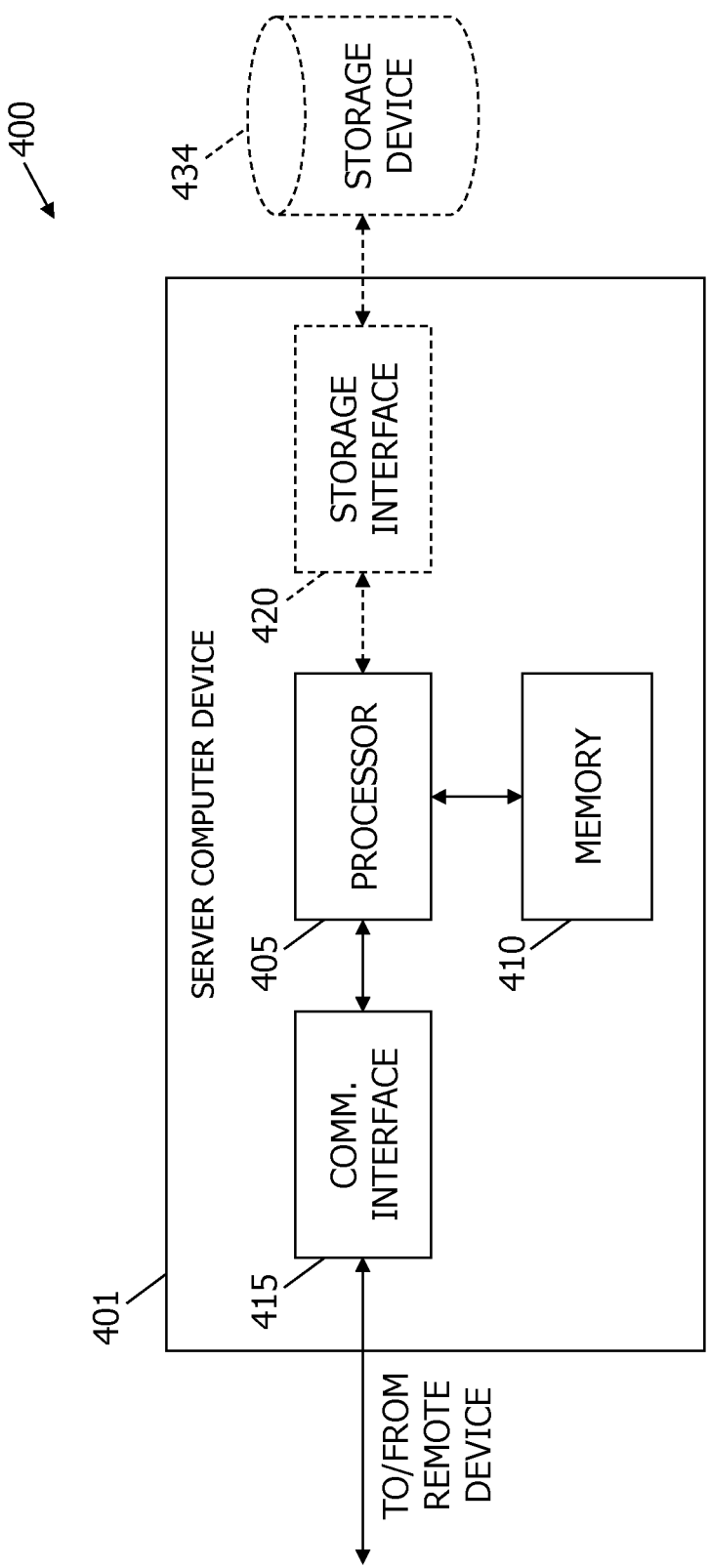

FIG. 4 illustrates an exemplary configuration of a server system 400, in accordance with an embodiment of the present disclosure. In the exemplary embodiment, server system 400 includes at least one server computer device 401, in electronic communication with at least one storage device 434. Server computer device 401 may include, but is not limited to, one or more of server system 212 and database server 216 (shown in FIG. 2). In the exemplary embodiment, server computer device 401 includes a processor 405 for executing instructions (not shown) stored in a memory 410. In an embodiment, processor 405 may include one or more processing units (e.g., in a multi-core configuration). The instructions may be executed within various different operating systems on the system 401, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

In the exemplary embodiment, processor 405 is operatively coupled to a communication interface 415 such that system 400 is capable of communicating with a remote device such as a user system or another system 400. For example, communication interface 415 may receive requests from client system 300 (FIG. 3) via the Internet, within the scope of the embodiment illustrated in FIG. 4.

In the exemplary embodiment, processor 405 is also operatively coupled to a storage device 434, which may be, for example, a computer-operated hardware unit suitable for storing and/or retrieving data. In some embodiments, storage device 434 is integrated in system 400. For example, system 400 may include one or more hard disk drives as storage device 434. In other embodiments, storage device 434 is external to system 400 and may be accessed by a plurality of systems 400. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via an optional storage interface 420. Storage interface 420 may include, for example, a component capable of providing processor 405 with access to storage device 434. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, and/or a similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

FIG. 5 is a simplified block diagram of an example distributed analytics system 500 for a peer to peer network utilizing a distributed ledger, in accordance with one embodiment of the present disclosure. System 500 includes a collector and committer node 502, a transactional node 504, an analytics node 506, and a participant node 508. Each of nodes 502, 504, 506, 508 includes at least one blockchain database 510, 512, 514, 516, respectively, having at least one memory and at least one processor therein (not separately shown), and each capable of transmitting to other nodes in network 500, and of receiving and storing information from a blockchain 518, and also of originating and committing blocks thereto. In an exemplary embodiment, blockchain 518 includes a dedicated blockchain processor (not shown).

In this example, only node 508 is labeled "participant." Nevertheless, a person of ordinary skill in the art will understand that, due to the peer to peer structure of system 500, each of nodes 502, 504, 506, 508 functions as a participant peer with respect to other nodes. Furthermore, all of the nodes in system 500 are configured to be capable of collecting distributed ledger information from blockchain 518, and committing new blocks thereto. Additionally, only one of each type of node is illustrated in FIG. 5, however, in practice, system 500 may include a plurality of one or more of the illustrated node types. In some embodiments, system 500 is a private network that only includes selected participant nodes. In other embodiments, system 500 is a public network, and includes restricted, permission-based access to blockchain 518, as well as the information appended on its particular ledger. In at least one embodiment, different nodes have different levels of access to blockchain 518.

In an exemplary embodiment, each of nodes 502, 504, 506, 508 represents a computing device of one of the parties of multi-party transaction card industry system 120 (FIG. 1, above). In an alternative embodiment, only one of the parties from system 120 participates directly in system 500, and other parties within system 120 interact with system 500 only indirectly through the participating party, and according to permissions, privacy, and security settings established by the participating party. In at least one embodiment, some but not all of the parties to system 120 participate in system 500. For example, merchant 124 and interchange network 128 may operate participating nodes in system 500, while cardholder 122 may not typically operate a distributed ledger node.

In operation, a payment transaction is performed between cardholder 122 and merchant 124, as described above, and transaction data is generated from the completed payment transaction. In this example, merchant 124 is represented by transactional node 504. The generated transaction data may include both payment account information of cardholder 122, which is typically confidential to cardholder 122 and interchange network 128, as well as sales data related to the payment transaction, such as product information, quantity of goods or services sold, location of purchase and/or delivery, etc. This sales data is also referred to as "SKU-level data" or "cart data." This example, merchant 124 stores the cart data in blockchain database 512.

Similar to the operation of server system 212 (FIG. 2, above), blockchain database 512 stores the cart data in a memory (not shown) and then compiles the cart data from the completed payment transaction into an envelope. In some embodiments, the envelope further includes one or more of an envelope ID or transaction ID, a network ID, a merchant ID, a certificate of merchant 124, a user ID, a device ID, a hash, a private key of merchant 124, currency information, and timestamps related to the payment transaction. The processor of blockchain database 512 then encrypts the compiled envelope and submits and encrypted transaction envelope 520 to blockchain 518, and thus all participating nodes in network 500.

In further exemplary operation, committer and collector node 502 receives encrypted transaction envelope 520 and processes the SKU-level data therein by validating the transaction data. In some embodiments, the transaction data is validated according to business rules and permissions stored within blockchain database 510, and node 502 generates a block 522 which is then propagated to blockchain 518 and thus broadcast to all participating nodes. In one embodiment, a portion of the participating nodes are granted permission to decrypt the encrypted data of broadcast transaction envelope 520, and only these nodes may then perform the consensus validation of block 522 to securely record the cart data of the transaction to blockchain 518 for analytics purposes.

In an exemplary embodiment, the processor of database 512 digitally signs encrypted transaction envelope 520 with an encryption key stored within database 512. The digital signature may be, include, or otherwise be associated with an address that is generated using the encryption key, which may be also associated with a blockchain currency utilized in the blockchain (e.g., bitcoin). In some embodiments, the address may be encoded using one or more hashing and/or encoding algorithms. In some embodiments, a second validation process is performed to eliminate redundant ledger entries, i.e., "replays," of the cart data (e.g., by broadcast envelopes by different nodes relating to the same payment transaction). Node 502 may process rejected replay transaction envelopes into separate blocks for further analysis and processing.

Encrypted transaction envelope 520 is received by all participant nodes in system 500 with listening capability. In one embodiment, collector and committer node 502 represents a computing device of a payment network or interchange network 128. In another embodiment, collector and committer node 502 represents a computing device of partner merchant who has been granted permission to view the encrypted SKU-level data from transactional node 504, and thereby from merchant 124. In one example, a POS terminal (e.g., POS system 222, FIG. 2) of merchant 124 captures the SKU-level data from a payment transaction and submits the captured cart data to a computing device of merchant 124, which then becomes the Data Owner of the cart data, which is then stored in blockchain database 512.

Once collector and committer node 502 validates the cart data according to specified business rules and commit the validated data to block 522 that is broadcast to other registered peer nodes for validation, the participating nodes may validate block 522 by consensus, after which block 522 is added to blockchain 518. In an exemplary embodiment, a DataAdmin 524 oversees administration of system 500. In some embodiments, DataAdmin 524 is represented by a separate node computing device. In other embodiments, DataAdmin 524 is incorporated within the electronic computing system of one of the participating nodes. DataAdmin 524 may be, for example, a certificate authority which issues and manages public and private keys. In some embodiments, transactional node 504 is configured to grant or revoke access to cart data (as well as other information) contained within envelope 520. In at least one embodiment, DataAdmin 524 includes and/or maintains the blockchain processor of blockchain 518.

In an exemplary embodiment, analytics node 506 represents a computing device of an Analytics Processor which is granted permission to decrypt and store the cart data from envelope 520 for further processing and analysis. In most embodiments, the analytics node 506 is granted permission to access only anonymized data from transactional node 504. In some embodiments, analytics node is configured to query one of the other participating nodes, e.g., through network messages, for access to block 522, or the encrypted data within envelope 520. DataAdmin 524 is configured to internally track access rights for all participating nodes, and includes controls to allow any participating node (e.g., transactional node 504) to revoke access of other participating nodes.

FIG. 6 is a flow diagram illustrating an exemplary process 600 for publishing merchant sales data to a distributed ledger, in accordance with an embodiment. In an exemplary embodiment, process 600 begins at step 602, where a POS system or device (e.g., POS system 222, FIG. 2) of a server system (e.g., server system 212, FIG. 2) is configured to capture SKU-level sales data from a payment transaction and transmit the non-account transaction data to a transactional node (e.g., node 504, FIG. 5). In step 604, the transactional node stores the received transaction data in a distributed ledger/blockchain database (e.g., blockchain database 512, FIG. 5) of the transactional node computing device.

In step 606, the blockchain database compiles the stored sales data into a transaction envelope. In some embodiments, along with the compiled sales data, blockchain database further includes within the transaction envelope one or more of an envelope ID, a transaction ID, a network ID, a merchant ID, a certificate of merchant 124, a user ID, a device ID, a hash, a private key of merchant 124, currency information, and timestamps. In at least one embodiment, the stored sales data of the payment transaction includes the identity of the party to the payment transaction associated with the transactional node. With the payment transaction is performed between two parties that both are associated with participating nodes on the peer to peer network, the stored sales data may include the identity of both parties. In an exemplary embodiment, the identity is stored with the collected sales data as a hashed identifier, which may be signed by a key of one or both participants.

In step 608, the blockchain database encrypts the compiled transaction data with a private key of the transactional node and, in step 610, broadcasts the encrypted transaction envelope (e.g., envelope 520, FIG. 5) to all participating nodes, which are configured to have listening capability to receive the broadcasted encrypted transaction envelope. In step 612, a collector/committer node (e.g., node 502, FIG. 5) verifies the broadcast encrypted envelope and the transaction data contained therein according to one or more business rules, and adds the sales data obtained from the encrypted envelope to a data block (e.g., block 522, FIG. 5). In some embodiments, the collector/committer node decrypts the encrypted envelope (e.g., through permissions granted by the transactional node) prior to adding the sales data to the data block.

After verification, in step 614, the collector/committer node commits the data block to the distributed ledger for validation by the participating nodes. In step 616, the participating nodes validate by consensus the committed data block. After consensus is achieved, in step 618, the validated data block is added to the distributed ledger, such as by being appended to a blockchain. In some embodiments, one or more of the nodes performs a second validation of the block by computing a hash of the committed data block, and comparing the computed hash with different data blocks committed within a last commit window. If the computed hash matches a hash of a different data block within the last commit window (e.g., 5 minutes), the block is rejected. This second validation process advantageously avoids or eliminates "replays" from being appended to a blockchain. That is, this second validation process eliminates redundant ledger entries, which may, for example, occur when more than one participant node propagates the committed block during the same commit window. In at least one embodiment, such rejected blocks are stored in a separate block during each commit window.

In an exemplary embodiment of process 600, the participating nodes communicate with each other over the electronic network through a plurality of network messages. Examples of such network messages include, without limitation, Discovery, Registration, De-registration, Heartbeat, and GetBlock, as described above.

Discovery may, for example, include a subset of messages including, without limitation: (i) Version, which indicates a version of a node joining the network (see FIG. 7, below); (ii) VersionAck, which may be transmitted as a reply with a version of an existing node responding to the Version call; (iii) Address, which indicates a request for the list of current participating nodes; and (iv) NodeList, which may include a list of current participating nodes, such as in response to the Address call.

Registration may, for example, include a subset of messages including, without limitation: (i) Join, which is a request message from a candidate node with discovery capability to join the network; (ii) Node Type, which indicates a record of the candidate node; (iii) Join List, which may include a list of nodes to which the Join request is submitted; (iv) Heartbeat, which indicates a record of the status of a node (which may include the candidate node, once registered) intending to remain active on the network; and (v) Heartbeat List, which may indicate a list of nodes to which the Heartbeat is transmitted. De-registration may, for example, include an explicit Leave message.

For registration of joining nodes, identity management and authentication of the joining node may be administered by the network permissions management, such as the DataAdmin. Permissions credentials, such as certificates and keys, can be issued to joining nodes at the time of set up or provisioning, and then registered within the network or system. In an exemplary embodiment, when a joining node sends its first registration message to the network, the credentials of the joining node are validated at both the transport layer (e.g., with Managed SSL certificates), and also at the application layer, where a node identity value is provided, along with the role the node has been assigned, which determine the level of access for the joining node, as well as restrict the actions in which the node may participate or perform.

GetBlock may, for example, include a subset of messages including, without limitation: (i) Inventory, which indicates a list of available inventory entries that may be included within the transaction data added to the data block for a pending to the distributed ledger; (ii) GetData, which may include a list of requested inventory entries from the Inventory call; (iii) Not Found, which represents one type of return message that may be transmitted in response to a GetData requests when no requested inventory entries are found; (iv) Receipt Add, which is a common field shared by all transactions, and represents an instruction to add SKU-level data to the ledger; and (v) Trust Extension, which is also a common field, and represents an instruction to grant or revoke third party access to a specific ledger entry. The Trust Extension message may further indicate a unique address of an account/node 4 which permissions must be modified, and or the level of trust granted to the account to be modified (e.g., including write access, read access, and revocation).

In at least one embodiment of process 600, the participating nodes may further transmit application messages, including without limitation: (i) Send Txn, which may represent an instruction to broadcast the transaction envelope to participating nodes in the network; (ii) Publish Block, which represents an instruction message to emit the last of validated block for all interested/participating network nodes to receive/consume; (iii) Validate Block, which is an instruction or a node to provide a block ID to determine the data integrity of a block represented by the block ID; and (iv) Get Chain, which represents a request/instruction for a node to download and store a blockchain to which that particular node has been granted access or permission.

Figure 7:
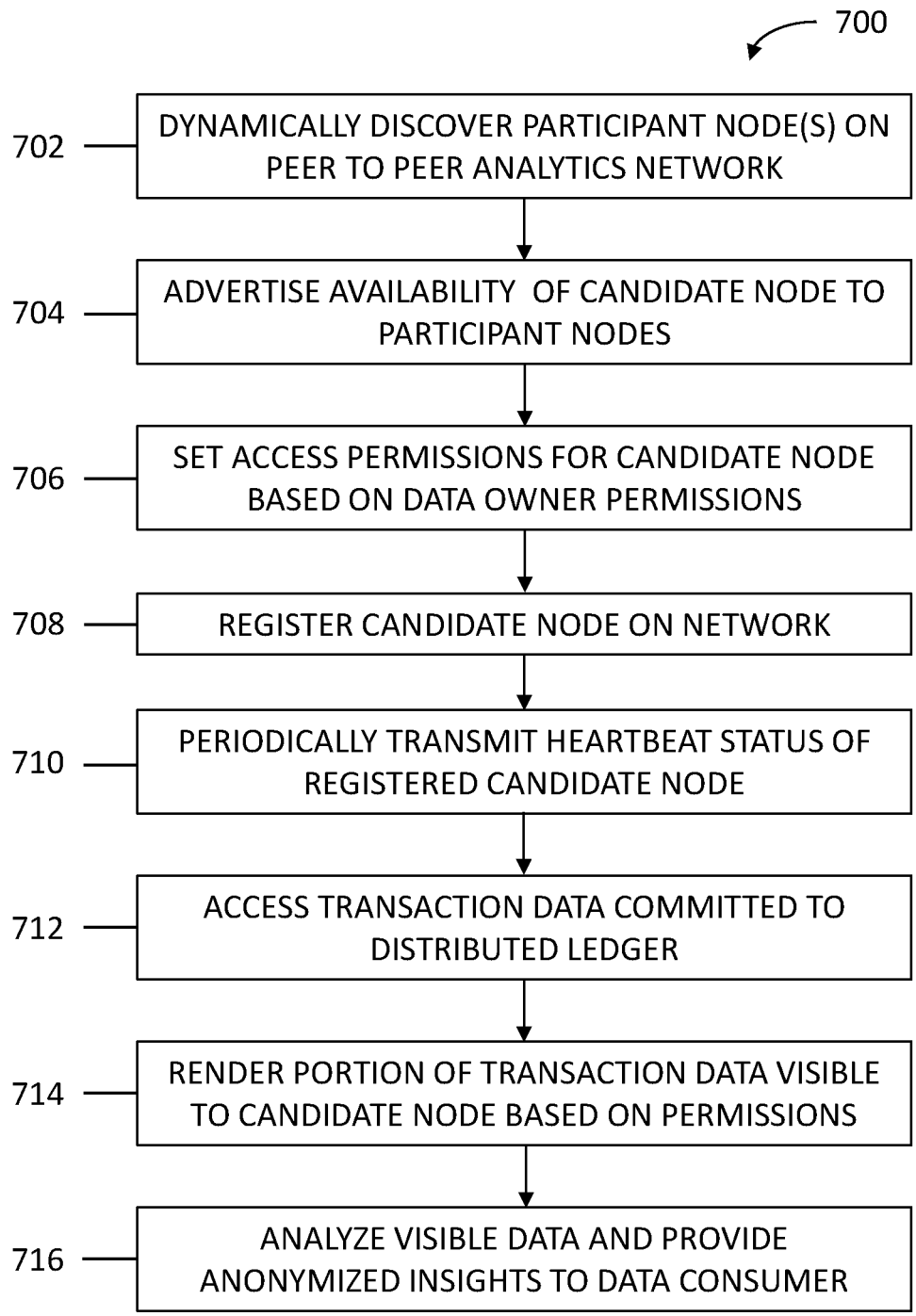

FIG. 7 is a flow diagram illustrating an exemplary process 700 for configuring and adding nodes to the distributed analytics system shown in FIG. 5, in accordance with an embodiment. In in an exemplary embodiment, new nodes may be added to the network on a trust-based discovery system, which may include, for example, use of certificates and signature tokens. In one example of process 700, when a new candidate node is added to the network, the candidate node will have an address of a primary node for the geographic zone configured in an address book associated with the particular entity. The primary node may then validate the credentials of the candidate node, determine whether the candidate node may join the network, and assign a role to the candidate node defining the level of participation thereof in the network. Once a candidate node is granted such access and joins the network, candidate node may receive the addresses of other peer nodes within the same geo zone.

More particularly, in the exemplary embodiment, process 700 begins at step 702, where a new candidate analytics node (e.g., node 506, FIG. 5) seeks to access and or join the peer to peer distributed ledger network, and uses the listening capability of its computer device to dynamically discover one or more participating nodes on the network. In step 704, the candidate node advertises its availability to one or more of the discovered participant nodes (e.g., through one or more of the network messages described above with respect to FIG. 6). In step 706, the network (e.g., through its DataAdmin) sets the access permissions for the candidate node (e.g., utilizing certificates and keys) based on rules or permissions established by the node associated with at least one Data Owner.

In step 708, the candidate node is registered on the network according to the access permissions granted to the candidate node by the system. Step 710 is an optional step. In step 710, the candidate node, once registered on the network, periodically transmits a Heartbeat message to other participating nodes indicate that the registered candidate node remains active, and should not be removed from the network. In some embodiments, the Heartbeat message may be transmitted by any node, at any time while the peer to peer analytics network remains active. In step 712, the registered candidate accesses a data block (i.e., to which the registered candidate has been granted permissions) containing transaction sales data appended to a blockchain of the distributed ledger by at least one other peer node on the network. In step 714, at least a portion of the relevant transaction sales data from the blockchain is rendered visible to the registered candidate node for data analytics purposes of the transaction sales data. The amount of the portion of visible transaction data is determined according to the permissions set by the data owner for the candidate node.

In step 716, the registered candidate node analyzes in real-time the transaction data to which it has been granted access, and provides anonymized insight information to a data analytics consumer based on the real-time analysis. In some embodiments, the data analytics consumer is itself represented by a participant node in the network (e.g., transactional node 504, FIG. 5), such as a merchant which submits its own SKU-level data to the network according to specific levels of permission predetermined by the merchant at or before the time the transaction data is submitted to the network.

Through the advantageous embodiments described herein, the present systems and methods allow merchants to easily submit their transaction sales data to third-party Analytics Providers in real-time. Conventional analytics systems are provided large quantities of transaction data that is aggregated over periods of months or years before submitted for data analysis. According to the present embodiments, a merchant may confidentially submit its own SKU-level at or near the time of each payment transaction conducted with the merchant, without needing to aggregate large volumes of data over time.

Furthermore, according to the embodiments disclosed herein, a merchant is not required to resubmit its collected payment transaction card data to a new Analytics Provider when terminating its relationship with a previous Analytics Provider. According to the systems and methods disclosed herein, a new third-party analytics provider need only register its own node on the distributed peer to peer analytics network, obtain the appropriate permissions from the Data Owner merchant, and then access the distributed ledger/blockchain according to the granted permissions. These embodiments therefore represent a significant improvement over conventional systems by advantageously providing a merchant (or other business entity) the ability to securely publish its transaction sales data in a real-time matter, while also drastically scaling down the cost and complexity of the analytics infrastructure required for a typical large transactional business to store and analyze its own commodity data.

In the embodiments described above, the securely published transactional sales data will can be provided as anonymized, pseudo-anonymous, and or masked data, such that no personal account information of a cardholder is inadvertently published to the network. Through this significantly simplified analytics data publishing process, smaller businesses may securely submit their data for analysis by an Analytics Provider on a more level footing with large businesses, and without requiring smaller businesses to invest in prohibitively costly and complex data collection and analysis infrastructures that are prevalent in conventional analytics systems.

Furthermore, by securely submitting transactional sales data in real time over a distributed ledger peer to peer network, the present embodiments avoid the cumbersome complexity, as well as additional cost, associated with conventional centralized analytics systems, which are frequently inaccessible to smaller business entities. Accordingly, the present embodiments allow for significantly easier dissemination of transaction sales data to Analytics Providers, while also allowing a Data Owner to maintain essentially total control of its own data, even after publishing to the network, through the power of encryption, granted rights and access, and revocation thereof.

Additionally, old data on the ledger need not be purged, since the immutable nature of the distributed ledger renders it extremely difficult to add unverified data, and the new data appended to the distributed ledger may simply render older data is automatically up-to-date, once the new data is added to the ledger.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for operating a distributed peer to peer analytics system of a permissioned distributed ledger, the system including a plurality of node computing devices in operable communication with each other over an electronic network, the method comprising the steps of:

implementing, by a DataAdmin node of the plurality of node computing devices, a certificate authority which issues and manages a plurality of public and private keys for controlling access to specific blocks on the permissioned distributed ledger, wherein the DataAdmin node is associated with a participating merchant or consumer and is configured to control access to anonymized data over the electronic network;

assigning, by the DataAdmin node, a first private key to a data owner, wherein the first private key designates ownership of data blocks encrypted using the first private key;

capturing, by a merchant computing device associated with the data owner, sales data from a payment transaction;

compiling, by a transactional node of the plurality of node computing devices, the captured sales data into a transaction envelope;

encrypting the transaction envelope with the first private key of the data owner;

submitting, by the transactional node over the electronic network, the encrypted transaction envelope to the others of the plurality of node computing devices;

verifying, by a collector node of the plurality of node computing devices, the submitted encrypted transaction envelope;

adding, by the collector node, the compiled sales data to a data block;

committing, by the collector node, the data block to the permissioned distributed ledger;

broadcasting the committed data block to the plurality of node computing devices;

validating, by a consensus of the plurality of node computing devices, the committed data block;

in response to validating the committed data block, publishing, to the plurality of node computing devices, the validated committed data block;

receiving, by the DataAdmin node from the data owner subsequent to validation of the committed data block, an instruction to grant, to a candidate node, a first level of access to a specified entry of the permissioned distributed ledger corresponding to the validated committed data block;

setting, by the DataAdmin node, access permissions for the candidate node, including assigning a permission key of the plurality of public and private keys, the permission key corresponding to the first level of access to the validated committed data block;

registering, by the DataAdmin node, the candidate node on the electronic network according to the access permissions;

receiving, at one of the plurality of node computing devices from an analytics node computing device of the plurality of node computing devices, a request for access to at least a portion of the compiled sales data in the validated committed data block, the request including the permission key; and granting, by the one of the plurality of node computing devices to the analytics node computing device, permission to access at least the portion of the compiled sales data, the permission corresponding to the first level of the access based on the permission key.

2. The method in accordance with claim 1, wherein the permissioned distributed ledger is a blockchain including at least one blockchain processor.

3. The method in accordance with claim 1, wherein, in the step of compiling, the transaction envelope further includes one or more of an envelope ID, a transaction ID, a network ID, a merchant ID, a certificate of merchant, a user ID, a device ID, a hash, a private key of merchant, currency information, and timestamps.

4. The method in accordance with claim 1, wherein the step of submitting causes the step of broadcasting the encrypted transaction envelope over the electronic network to the plurality of node computing devices.

5. The method in accordance with claim 4, wherein one or more of the plurality of node computing devices has listening capability.

6. The method in accordance with claim 1, wherein the step of verifying further comprises decrypting, by the collector node, the encrypted envelope and verifying transaction data within the decrypted envelope according to one or more business rules.

7. The method in accordance with claim 1, further comprising the step of adding the validated committed data block to the permissioned distributed ledger.

8. The method in accordance with claim 1, wherein the step of validating comprises (i) computing a hash of the committed data block, and (ii) comparing the computed hash with different data blocks committed within a last commit window.

9. The method in accordance with claim 8, wherein the committed data block is rejected from the permissioned distributed ledger when the computed hash matches a hash of a different data block committed within the last commit window.

10. The method in accordance with claim 9, wherein the rejected data block is stored in a separate block during a commit window.

11. The method in accordance with claim 1, wherein the plurality of node computing devices communicate with each other over the electronic network through a plurality of network messages.

12. The method in accordance with claim 11, wherein the plurality of network messages includes one or more of discovery, registration, de-registration, heartbeat, and get block messages.

13. The method in accordance with claim 11, wherein communication over the electronic network further utilizes application messages including one or more of send transaction, publish block, validate block, and get chain messages.

14. A distributed analytics system for operating a distributed ledger for a peer to peer electronic network of participating nodes, comprising:
   at least one blockchain including at least one blockchain processor;
   a transactional node computing device configured to:
      capture and compile transactional sales data into a transaction envelope;
      encrypt the transaction envelope with a first private key of a data owner; and
      submit the encrypted transaction envelope to the participating nodes;
   a collector node computing device configured to:
      collect, verify, and validate the submitted transaction envelope according to one or more business rules;
      add the transactional sales data to a data block;
      commit the data block to the distributed ledger; and
      broadcast the committed data block to the participating nodes, such that the participating nodes validate, by consensus, the committed data block;
   an analytics node computing device configured to:
      discover at least one available node of the participating nodes;
      advertise to the at least one available node an availability as a candidate node to participate in the electronic network of the participating nodes;
      transmit, to one of the participating nodes, a request for access to at least a portion of the compiled transactional sales data in the validated committed data block, the request including a permission key;
      in response to receiving permission from the one of the participating nodes to access at least the portion of the compiled transactional sales data, access the validated committed data block, the permission corresponding to a first level of access based on the permission key; and
      query the validated committed data block to analyze the transactional sales data on the validated committed data block; and
   a DataAdmin computing device configured to:
      implement a certificate authority which issues and manages a plurality of public and private keys for controlling access to specific blocks on the distributed ledger, wherein the DataAdmin computing device is associated with a participating merchant or consumer and is configured to control access to anonymized data over the electronic network;
      assign the first private key to the data owner, wherein the first private key designates ownership of data blocks encrypted using the first private key;
      receive, from the data owner subsequent to validation of the committed data block, an instruction to grant, to the candidate node, the first level of access to a specified entry of the distributed ledger corresponding to the validated committed data block;
      set access permissions for the candidate node, including assigning the permission key of the plurality of public and private keys, the permission key corresponding to the first level of access to the validated committed data block; and
      register the candidate node on the electronic network according to the access permissions.

15. The system in accordance with claim 14, wherein the peer to peer electronic network is one of at least a public network and a private network.

16. The system in accordance with claim 14, wherein the transactional node computing device is configured to communicate with a point of sale computing device that originates the transactional sales data from a payment transaction.

17. The system in accordance with claim 14, wherein the collector node computing device and the analytics node computing device have different respective access permissions to the blockchain.

18. A method for establishing an analytics candidate node on distributed peer to peer network utilizing a distributed ledger, comprising the steps of:
   implementing, by a DataAdmin node on the peer to peer network, a certificate authority which issues and manages a plurality of public and private keys for controlling access to specific blocks on the distributed ledger, wherein the DataAdmin node is associated with a participating merchant or consumer and is configured to control access to anonymized data over the peer to peer network;
   receiving, by the DataAdmin node from a data owner subsequent to validation by the peer to peer network of a committed data block signed by a private key of the data owner, an instruction to grant, to the analytics candidate node, a first level of access to a specified entry of the distributed ledger corresponding to the validated committed data block;
   setting, by the DataAdmin node, access permissions for the analytics candidate node, including assigning a permission key of the plurality of public and private keys, the permission key corresponding to the first level of access to the validated committed data block;
   registering, by the DataAdmin node, the analytics candidate node on the electronic peer to peer network according to the access permissions;
   discovering, by the registered analytics candidate node, at least one available node on the peer to peer network;
   advertising, by the registered analytics candidate node to the at least one available node, an availability of the analytics candidate node to participate in the peer to peer network;
   transmitting, by the registered analytics candidate node, a request for access to the validated committed data block of the distributed ledger containing transaction transactional sales data entered on the distributed ledger by at least one peer node of the peer to peer network, the request including the permission key corresponding to the first level of access; and
   accessing, by the registered analytics candidate node, the validated committed data block of the distributed ledger containing the transaction transactional sales data wherein a portion of the transactional sales data is rendered visible to the registered analytics candidate node according to the first level of access.

19. The method in accordance with claim 18, further comprising a step of analyzing, by the registered analytics candidate node, the portion of visible transactional sales data within a predetermined time of a last commit window for the validated committed data block.

20. The method in accordance with claim 19, further comprising a step of providing to an analytics consumer, by the registered analytics candidate node, anonymized insight information based on the analyzed transaction data.

* * * * *